United States Patent Office 3,306,864
Patented Feb. 28, 1967

3,306,864
PHENOL FORMALDEHYDE-UREA RESIN COMPONENT BINDER
Edward J. Lang, Grand Island, Frank S. Grazen, North Tonawanda, and Frank W. Less, Kenmore, N.Y., assignors to Hooker Chemical Corporation, Niagara Falls, N.Y., a corporation of New York
No Drawing. Filed Nov. 29, 1962, Ser. No. 241,021
20 Claims. (Cl. 260—17.2)

This is a continuation-in-part of copending application Serial Number 107,317, filed May 3, 1961, now abandoned.

This invention relates to new and useful improvements in the production of phenolic resin binders, to the novel process for applying these binders to discrete, inert solid particles, and to the novel compositions produced thereby.

Resin binders have been employed heretofore in the preparation of consolidated materials by bonding discrete inert solid particles such as sand, abrasive grit, wood chips, and the like.

Foundry cores, for example, are prepared by first admixing sand and a suitable binder. The mixture is then blown or tamped into a suitable cold pattern or core box. The shaped solid article is then removed from the core box and baked in an oven at temperatures of approximately 350 to 450 degrees Fahrenheit for about one-half to four hours.

When phenolic resins are used, such as in the "shell process," resin coated sand is blown into a hot core box maintained at a temperature of approximately 300 to 600 degrees Fahrenheit and cured for about ten seconds to two minutes depending upon the temperature of the core box and the desired thickness of the core. The resin binder sets, consolidates the sand, and the core is ejected as a finished product. The core produced in the shell process and in the comparatively fast operating cycles are hollow cores possessing a wall thickness of the order of one-eighth to one-half inch. Shell cores can be made by filling a core box with resin coated sand, allowing the required wall thickness to build up, and then dumping the excess to be used in the next cycle. They are also produced by blowing the resin coated sand into a core box wherein the core thickness is governed by the contours of the closed assembly. In this case there is no excess sand to dump out and the core is cured by the heated core box. For these purposes, two-step phenol formaldehyde resins are generally preferred.

Even though excellent commercial results have been experienced with the shell process, attention has been directed to the production of foundry cores wherein the advantages of the shell process are retained and some disadvantages eliminated. The principal disadvantage of the shell process is the need for providing a dry free-flowing sand. It was thought that improvements could also be made in curing cycle time and in the amount of resin binder required per unit weight of sand. To these ends this invention is directed.

The one-step phenol formaldehyde resins generally can be accelerated with acids and made to set very rapidly. Without the accelerator, these resins set at a slower rate. However for the production of solid cores these resins are often unsatisfactory because the setting characteristics at low temperatures are dependent upon an exotherm which is insufficient to bring about a fast set. Phenolic resins of the one-step type will produce a set up shell on the outside of a solid core in a matter of seconds at temperatures of approximately three hundred to six hundred degrees Fahrenheit, but the interior of the core remains wet and uncured for days and in some cases indefinitely after removal from the hot box.

Certain urea formaldehyde resins have been used to produce solid or hollow cores with fast operating cycles. Some of the disadvantages encountered with urea resin bonded cores are as follows:
(1) They lack moisture resistance.
(2) They decompose with formation of very little or no carbon bond.
(3) Lachrymous odors are emitted during curing.

This lack of carbon creates a weak structure in the presence of molten metal resulting in a rough casting surface, which is commonly referred to as a "burn in" condition. Due to this weakness in the presence of molten metal it is necessary to apply a "core wash" which provides the core with a coating of graphite, silica, or clay. "Core washes" most preferably and most commonly used are suspensions of the desired materials in water. When a urea resin bonded core is "washed" the resin binder tends to absorb some of the water and swell. The swelling produces a permanent dimensional change in castings prepared from these cores.

It is also necessary in some cases to store the cores produced. Storage of urea resin bonded cores is troublesome due to their ability to absorb atmospheric moisture which causes a loss in strength and a rapid disintegration of the core.

In the production of boards utilizing wood or wood waste and commonly referred to as "Chip Board," "Particle Board," or "Flake Board," urea resins are used as binders primarily because of their ability to set at relatively low temperatures. Urea resin binders produce boards satisfactory for most interior applications but are deficient in moisture resistance for most exterior applications. Phenolic resin binders provide the necessary moisture resistance for exterior applications but are deficient in curing characteristics at temperatures of about three hundred degrees Fahrenheit and below to be economically practical for this purpose. For example, a three-quarter inch wood waste board pressed at a temperature of about three hundred degrees Fahrenheit will have a maximum internal temperature of about two hundred degrees Fahrenheit during the pressing and curing cycle. This is primarily due to the insulating effect of the wood and its residual moisture. This temperature is too low to cure a phenolic resin properly in an economically permissible operating cycle.

It is an object of this invention to provide an improved phenolic resin binder which overcomes disadvantages inherent in previously available binders.

Another object of the invention is to provide an improved phenolic resin binder capable of producing relatively strong consolidations for applications in the foundry industry and other industries where sand or other discrete inert solid particles are bonded.

Another object of the invention is to provide an improved phenolic resin binder having relatively high strength characteristics and rapid thermosetting properties so as to provide very rapid operating cycles.

Still another object of the invention is to provide an improved phenolic resin binder having a high degree of moisture resistance in the cured state.

It is a further object of the invention to provide a novel resin binder composition containing a urea component which is substantially free lachrymous odors when cured.

A further object of the invention is to provide an improved binder for use in the preparation of wood waste boards employing relatively low temperatures and rapid operating cycles.

A further object of the invention is to provide a novel process for preparing consolidated materials such as foundry cores and wood waste boards.

Still another object of the invention is to provide novel foundry cores or molds.

It is another object of the invention to provide novel wood waste board compositions.

These and other objects of the invention will be apparent from the following detailed specification.

It has now been discovered that excellent binder compositions for discrete solid particles are formed by admixing a liquid one-step phenol formaldehyde resin with a urea resin component, a suitable curing accelerator and discrete solid particles to yield a wet mixture. The resulting mixture is then heated to complete curing of the resin to yield composite material having a strong, moisture resistant resin binding the solid particles.

The phenol-formaldehyde resin component of the novel binder is a liquid, water-soluble one-step type which has been partially condensed in a manner well known in the art. For example, formaldehyde and phenol are reacted in proportions equivalent to a molar ratio between 1.5:1 and about 1:1 and about 3:1 and preferably between about 2.5:1 in the presence of a suitable alkaline catalyst such as sodium hydroxide. The mixture is heated, for example, to a temperature between about sixty and about seventy degrees centigrade, until the reaction is sufficiently complete to yield a resin having a water tolerance or water solubility of preferably at least about 200 percent. However, resins with a water tolerance of at least 50 percent can be used if desired. The water tolerance is preferably in the range of about 200 to about 500 percent to maintain the resin viscosity in an easily workable range. A reaction period of between about ten and about twenty minutes generally effects this result, but the time will vary with the reaction conditions and the proportions of reactants.

The water solubility or water tolerance of the phenol formaldehyde resin is the amount of water, in weight percent which, when added to the resin, will cause the resulting mixture to become turbid, as measured by the Smith Turbidimeter. This procedure is described more fully hereinafter.

Various modifications of the above procedure for preparing the one-step phenol formaldehyde resin can be employed. For example, all or part of the phenol can be replaced with similar phenolic compounds such as cresol, xylenol, cresylic acid, and mixtures thereof. Other catalysts include other alkali metal hydroxides, amines, sodium carbonate, sodium bisulfite, and the like. The aqueous liquid phenol formaldehyde resin can be partially dehydrated to a desired solids content.

The term "urea resin component" as used throughout the specification and claims include: (1) urea-formaldehyde compositions, and (2) thiourea-formaldehyde compositions, per se; as well as (3) urea-formaldehyde or thiourea-formaldehyde compositions resulting from the reaction of urea or thiourea with urea- and thiourea-formaldehyde compositions during the course of the process of the invention. The molar ratio of urea to formaldehyde in the urea resin component should be between about 1:1 and about 1:5.

Urea- and thiourea-formaldehyde compositions can be prepared by reacting urea and/or thiourea and formaldehyde in a molar ratio of from about 1:1 to about 1:5, respectively. The reaction temperature is generally in the range of 25 to 125 degrees centigrade, although higher and lower temperatures can be used. The pH of the reaction mixture is regulated in the range of about 3 to 9.5, with the lower value of pH being used at the lower reaction temperatures and the higher value of pH at the higher reaction temperatures. The reaction is continued for a period of about one to four hours depending on the degree of reaction desired, since from one to four molecules of formaldehyde can be reacted with each molecule of urea. The completion of the desired reaction is conveniently determined by monitoring the viscosity of the reaction mixture. The final products are usually in liquid form and are conveniently used as such in the instant invention. However, in some cases it may be desirable to convert the product to a solid form by drying. One such product that is commercially available is dimethylol urea.

Suitable curing accelerators for use in the invention include aqueous solutions of strong mineral acids, such as hydrochloric acid, sulfuric acid, phosphoric acid, and the like. Organic acids such as maleic acid, toluene sulfonic acid, oxalic acid, fumaric acid, acetic acid, glycolic acid, sulfamic acid, boric acid, citric acid, and the like are also satisfactory. Other suitable accelerators include the ammonium salts of the aforesaid acids, such as ammonium chloride, ammonium sulfate, monoammonium phosphate, diammonium phosphate, triammonium phosphate, ammonium acetate, ammonium sulfamate, ammonium borate, ammonium citrate, ammonium phosphate and mixtures thereof. In addition, the ammonium salts can be formed in situ by introducing into the resin components the compounds capable of forming the ammonium salts. For example, acetic acid and ammonium hydroxide can be added to the mixture of resin and solid inert particles to form ammonium acetate in situ. Other salts such as ferric chloride, zinc chloride and iron ammonium sulfate can be employed, but are less preferred. The accelerator can be used in preparing the compositions of the invention as a solid or as an aqueous solution.

In preparing the compositions of the invention, sufficient urea resin component is employed to provide between about ten percent and about fifty percent and preferably between about fifteen percent and about forty percent by weight of urea or thiourea, based upon the phenol formaldehyde solids contained in the liquid resin. The proportion of accelerator to the resinous components (i.e., aqueous liquid phenol formaldehyde resin and urea resin component), is generally between about one and about thirty percent, and is preferably between about two and about twenty weight percent based on the total resinous component solids.

The urea resin component of the novel binder can be combined with the phenolic component by a number of procedures. First, the urea resin component can be admixed with the phenol formaldehyde resin after completion of the phenolic reaction. In a second method the urea resin component, such as a urea-formaldehyde precondensate is introduced into a reactor, followed by addition of phenol and then formaldehyde so that the phenolic reaction occurs in the presence of the urea component. In still a third method, the phenolic component is introduced into a reactor, followed by addition of urea and then formaldehyde so that the preparation of the urea resin component occurs in the presence of the phenolic component. Other variations in the reaction sequence can be employed without departing from the scope of the invention. Thus, the urea resin component can be a dimethylol urea composition which can be added to the phenol formaldehyde resin as a finely divided solid, but is preferably added as an aqueous solution. In still another variation, illustrated in greater detail in the specific examples, a mixture of the phenolic component and urea resin component can be provided by one of the foregoing procedures, and in the course of mixing the resin components with the inert solid particles in accordance with the invention, additional urea can be added to the mixture of resin components and solid particles. Such additional urea is conveniently introduced in admixture with the accelerator, and reacts with uncombined formaldehyde in the urea resin component. It is apparent that many variations are possible to attain the desired ratios of the phenolic component, urea resin component and accelerator set forth in the preceding paragraph.

The resin components and accelerator can be combined with the discrete, inert, solid particles by several procedures.

Following is a typical example:

A portion of foundry sand is introduced into a commercial muller or other suitable mixer. The accelerator is added to the sand and mixed for one-half to five minutes. Thereafter, a mixture of phenol formaldehyde resin and urea resin component is added and mixing continues for one-half to five minutes to provide a "wet mixture" suitable for use in subsequent production of foundry cores.

Alternatively, the resin components can be added to the sand first, followed by the accelerator. The resin components and accelerator can be pre-mixed prior to introduction to the sand, but this is usually not done because of the slow curing of the resin components that would occur at room temperature if the mixture could not be utilized in a reasonable period of time. Also as indicated hereinbefore, a mixture of resin components can be introduced to the sand, followed by a mixture of accelerator and urea to provide for the reaction of additional urea with uncombined formaldehyde in the resin components.

The proportion of the resin binder, which is comprised of the mixture of phenol formaldehyde resin, urea resin component and accelerator, added to the discrete solid particles is generally between about 0.2 and about 5 percent and is preferably between about 0.5 and about five percent of resin solids based on the sand. When wood particles are treated, the proportion of resinous binder is generally between about two and about twenty percent and is preferably between about five and about twenty percent of resin solids based on the weight of the wood particles.

When sand is employed as the discrete solid particles, the resulting wet mix is suitable for foundry use, in the preparation of foundry cores and molds. When employed for these purposes, tack reducing additives such as kerosene or unctuous materials can be added to the wet mix to provide better blowing characteristics in the core blower.

The curing time of the wet mix will depend upon the concentration of the binder, the temperature conditions and the amount of accelerator employed. The temperature of the core box or mold is generally between about 350 to 500 degrees Fahrenheit, but higher or lower temperatures can be employed if desired. The cure time can be as little as about three seconds, and in some instances can range as high as two minutes. The curing time should be sufficient for the core to attain the strength required for it to support its own weight, and to facilitate its removal from the core box without injury. After the core is removed from the core box it is allowed to stand at room temperature. The residual heat in the core causes the binder in the interior of the core to cure and produces complete consolidation of the discrete particles.

The cores produced by the instant novel process have good resistance to deterioration due to high temperatures, high humidity, and frequent handling. In addition, the surfaces of the resulting cores are not adversely affected by conventional core washes.

While the foregoing discussion has referred to the production of sand cores, it is understood to also apply to the production of sand molds and miscellaneous sand products.

When the discrete particles employed in preparing the wet mix are wood chips, flakes or other wood waste particles, the wet mix may be pressed into boards or other desired shapes, then heated to temperatures of between about three hundred to five hundred degrees Fahrenheit until the resin is set. The resulting boards have high strength and good water resisting properties.

As discussed above, the water tolerance or water solubility of the one-step phenol formaldehyde resin may be determined using the turbidity of a mixture of the resin with water as the end point. The Smith Turbidimeter, which may be employed in this determination, is comprised of two adjacent enclosed chambers, one containing a source of red light and the other a source of white light. A glass beaker containing a seven gram sample of the resin to be tested is placed above an opening in the top of the chamber through which a vertical beam of red light passes. A horizontal beam of white light from the other chamber is directed through the sample to intersect the vertical beam of red light. Water is then added to the resin sample while agitating the mixture until the turbidity of the mixture is such that the red light beam is no longer visible. The water solubility is then determined in accordance with the following formula:

$$\frac{\text{ml. water added} \times 100}{\text{weight of resin sample}} = \text{percent water solubility}$$

The temperature of the water and the resin should be substantially equal during the determination. Small samples of the phenol-formaldehyde reaction mixture are removed periodically as the reaction progresses and tested in this manner until the water solubility is preferably at least about two hundred percent or more.

The following examples are presented to define the invention more fully without any intention of being limited thereby. All parts and percentages are by weight unless specified otherwise.

Example 1

A one-step water soluble phenol-formaldehyde resin was prepared as follows:

One hundred parts of phenol, one hundred and fifty parts of an aqueous formaldehyde solution (37.5 percent formaldehyde), and one part of sodium hydroxide were admixed and heated to a temperature of 65 to 75 degrees centigrade. Mixing and heating were continued until the resulting resin showed a water tolerance of about three hundred percent as determined by the Smith Turbidimeter. The resulting resin was then dehydrated to about sixty-five percent dissolved solids.

Fifteen parts of this phenol formaldehyde resin were admixed with fifteen parts of an aqueous solution of urea formaldehyde composition. The aqueous solution of urea formaldehyde composition contained about twenty-five percent urea, about sixty percent formaldehyde, and about fifteen percent water.

The resulting resin binder was mixed with sand and accelerator as follows. One and a half parts of 85 percent aqueous phosphoric acid which had been diluted with 10 parts of water, were mixed with 2000 parts of foundry sand for one minute. Then 30 parts of the resin binder were added to the sand and mixed for three minutes. The resulting wet mix was blown into a core box to form eight one-inch tensile bars. (Sometimes referred to as "figure 8" or "dog bone" type.) Four of the bars were heated in the core box for one-half minute at 440 degrees Fahrenheit, and the tensile test was determined on a Dietert Tensile Tester. The average tensile strength for the four bars was 217 p.s.i. The procedure was repeated on four tensile bars, using a curing time of one minute at 440 degrees Fahrenheit. The average tensile strength was 285 p.s.i.

For purposes of comparison the tests were repeated, with the exception that the aqueous urea formaldehyde solution and accelerator were omitted from the mix. The average strength of the test bars at 440 degrees Fahrenheit for one-half and one minute were 75 and 170 p.s.i., respectively. These comparative tests demonstrate the marked improvement in resin curing rate and strength obtained for corresponding curing temperatures and times when an urea resin component is employed as a component of the resin binder in accordance with the method of the instant invention.

Example 2

A portion (22.5 parts), of the phenol formaldehyde resin prepared in Example 1 was admixed with 7.5 parts of the aqueous urea formaldehyde solution of Example 1.

The resulting resin binder was mixed with sand and accelerator as follows. Two parts of water and 0.9 part ammonium chloride were mixed with 2000 parts of sand for one minute. Then 30 parts of the resin binder were added to the sand-accelerator mix and mixed for three minutes to yield a homogeneous mixture. Test tensile bars (one-quarter inch dog bones), were prepared and cured at 440 degrees Fahrenheit for one-half and one minute. The tensile strengths at one-half and one minute were 265 and 290 p.s.i., respectively.

*Example 3*

A portion (75 parts), of the phenol formaldehyde resin of Example 1 was admixed with 17.5 parts of the aqueous urea formaldehyde solution of Example 1, and 7.5 parts of solid particles of urea to yield a uniform mixture. Forty parts of this mixture were admixed for four minutes with four parts of a twenty percent aqueous ammonium chloride solution to yield a uniform mixture. This latter mixture was blended with two thousand parts of sand and then five parts of kerosene were admixed for two minutes. The resulting mix was then blown into a core box at 400 degrees Fahrenheit to form one-quarter inch tensile bars. Bars in the pattern for one minute had an average strength of 345 p.s.i. and those in the pattern for two minutes had an average strength of 315 p.s.i.

Similar tests employing other accelerators shown in the following examples give test bars having very good tensile strengths.

| Example No.: | Accelerator |
|---|---|
| 4 | Toluene sulfonic acid. |
| 5 | Ammonium sulfate. |
| 6 | Acetic acid. |
| 7 | Glycolic acid. |
| 8 | Ammonium sulfamate. |

In the preceding examples, the sand employed is designated "Wedron 7020" sand. This is a round grain sand having the following screen analysis:

| | Percent |
|---|---|
| On 40 mesh | 0.2 |
| 70 | 20.4 |
| 100 | 45.0 |
| 140 | 20.0 |
| 200 | 11.0 |
| Through 200 mesh | 3.4 |

In all the following examples in which sand was employed as the discrete particles, the sand employed is designated "Sargent Sharp" sand. This is an irregular grain sand having the following screen analysis:

| | Percent |
|---|---|
| On 40 mesh | 4.0 |
| 50 | 40.0 |
| 60 | 48.0 |
| 100 | 8.0 |

*Example 9*

A portion (75 parts), of the phenol formaldehyde resin of Example 1 was admixed with 17.5 parts of the aqueous urea formaldehyde solution of Example 1, and 7.5 parts of solid particles of urea to yield a uniform mixture. The resulting mixture was mixed with sand and accelerator as follows. Eighteen parts of an aqueous solution containing 50 percent water, 38 percent urea and 12 percent ammonium chloride were mixed with 3000 parts of sand for one minute. Then 60 parts of the resin mixture were added to the sand and mixed for three minutes. The resulting wet mix was used to prepare one inch test bars by blowing the mix into a core box maintained at a temperature of 425 degrees Fahrenheit retaining the core in the core box for the time specified below, and then allowing the core to cool to room temperature before testing the tensile strength. The period of time the test bars were retained in the core box and the average tensile strength of four test bars for each period are as follows:

| Time in core box, seconds | Tensile strength, p.s.i. |
|---|---|
| 5 | 63 |
| 10 | 135 |
| 20 | 179 |
| 30 | 216 |

It can be seen that a strength of 63 p.s.i. was obtained in only five seconds in this test while nearly thirty seconds were required to obtain a comparable strength (75 p.s.i.), in the test bars of the latter portion of Example 1, where no urea compound was employed, and only twenty seconds was required to obtain a strength of 179 p.s.i. in the instant example, while sixty seconds were required in the tests in the latter portion of Example 1, to obtain a strength of 170 p.s.i. The comparisons demonstrate that the binders of the instant invention have a greater rate of resin curing than phenol formaldehyde resins that do not contain urea compounds.

The following Examples 10 to 17, show in even greater detail the results of employing the compositions of the invention.

*Example 10*

A one-step phenol-formaldehyde resin was prepared as follows:

One hundred parts of phenol, 175 parts of an aqueous formaldehyde solution (37.5 percent formaldehyde), and one part of sodium hydroxide were admixed and heated to a temperature of 75 to 80 degrees centigrade. Mixing and heating were continued until the resulting resin showed a water tolerance of about 250 percent as determined by the Smith Turbidimeter. The resulting resin was then dehydrated to about 76 percent dissolved solids.

Then 227 grams of the phenol formaldehyde resin were mixed with 25 pounds of foundry sand. A portion of the resulting mixture was blown into a core box maintained at 425 degrees Fahrenheit to form test specimens. A series of such specimens were prepared and the members of the series were cured at 425 degrees Fahrenheit for varying periods of time as follows: 10, 15, 20, 25, 30, 60, 90 and 120 seconds. The strength of each cured specimen was determined on a Dietert Tensile Tester. The tensile strength results are shown in Table 1.

*Examples 11 to 17*

In these examples, the procedure set forth in Example 10 for preparing test specimens and determining the tensile strengths thereof was repeated. However the molding compositions were varied as follows.

In Examples 11 through 17, 21.2 grams of a 21.3 percent aqueous solution of ammonium chloride were incorporated in the molding compositions.

In Examples 12 and 13, there were also incorporated in the molding compositions 11.35 and 22.7 grams, respectively of urea, which corresponded to about 5 and 10 percent, respectively, of urea based on the total weight of resin binder.

In Examples 14 and 15, there were incorporated in the molding compositions 45.4 and 90.8 grams, respectively, of a urea-formaldehyde composition comprising the reaction product of 60 parts of formaldehyde, 25 parts of urea and 10 parts of water. The proportion of urea-formaldehyde composition used in Examples 14 and 15 corresponded to an incorporation of about 5 and 10 percent, respectively, of urea based on the total weight of resin binder.

In Examples 16 and 17, there were incorporated in the molding compositions 11.35 and 22.7 grams, respectively, of urea as well as 45.4 and 90.8 grams, respectively, of the urea-formaldehyde composition used in Examples 14 and 15.

The tensile strengths of the series of test samples prepared in Examples 11 through 17 are also shown in Table 1.

TABLE 1

| Example No. | 10 | 11 | 12 | 13 | 14 | 15 | 16 | 17 |
|---|---|---|---|---|---|---|---|---|
| Molding Composition: | | | | | | | | |
| Phenol-Formaldehyde Resin, grams | 227 | 227 | 215.65 | 204.3 | 181.6 | 136.2 | 170.25 | 113.5 |
| Urea-Formaldehyde Comp., grams | | | | | 45.4 | 90.8 | 45.4 | 90.8 |
| Urea | | | 11.35 | 22.7 | | | 11.35 | 22.7 |
| Ammonium Chloride Solution, grams (21.3% Solution) | | 21.2 | 21.2 | 21.2 | 21.2 | 21.2 | 21.2 | 21.2 |
| Sand, pounds | 25 | 25 | 25 | 25 | 25 | 25 | 25 | 25 |

Cure Time (Sec.) at 425° F.:      Tensile Strength, pounds per square inch

| | | | | | | | | |
|---|---|---|---|---|---|---|---|---|
| 10 | | | | | | (1) | (1) | 388 |
| 15 | | | (1) | | (1) | 146 | 219 | 488 |
| 20 | (1) | (1) | 137 | (1) | 121 | 226 | 297 | 519 |
| 25 | 50 | 102 | 152 | 87 | 177 | 336 | 363 | 532 |
| 30 | 82 | 120 | 172 | 120 | 185 | 367 | 383 | 551 |
| 60 | 226 | 365 | 286 | 220 | 449 | 474 | | 510 |
| 90 | 390 | | | | | | | |
| 120 | 328 | 414 | | 486 | 443 | 425 | | 469 |

[1] No cure.

A comparison of the data in Table 1 shows that the addition of an accelerator (Example 11) and an accelerator plus urea (Examples 12 and 13) improved the strength of the molded samples somewhat, but a cure time of 90 to 120 seconds was required to reach the maximum strengths attained in the tests. However when the urea-formaldehyde composition was incorporated into the compositions in addition to the other components (Examples 14 through 17), not only were the strength characteristics of the molded compositions significantly improved, but also the cure time required to reach the maximum strength was greatly reduced. Thus the molded compositions prepared in Example 17 reach a maximum strength of 551 p.s.i. in only 30 seconds. This reduction in curing time reduces the cycle time for making molds and cores and greatly enhances the commercial utility of the molding compositions of the invention.

In the following Examples 18 to 21, powdered dimethyl urea was used as the urea resin component.

*Example 18*

Twenty-five pounds of sand were placed in a muller, followed by 113 grams of powdered dimethylolurea (the reaction product of one mole of urea and two moles of formaldehyde). The materials were mixed for one minute. Then 114 grams of the phenol-formaldehyde resin of Example 10 and 27.6 grams of a 25 percent aqueous solution of ammonium chloride were added and mixing was continued for three minutes.

A portion of the resulting mixture was blown into a core box maintained at 375 degrees Fahrenheit to form test specimens. A series of such specimens were prepared and the members of the series were cured at 375 degrees Fahrenheit for varying periods of time as follows: 10, 15, 20, and 30 seconds. The strength of each cured specimen was determined on a Dietert Tensile Tester. The tensile strength results are shown in Table 2.

*Examples 19 to 21*

In these examples, the procedure set forth in Example 18 for preparing test specimens and determining the tensile strengths thereof was repeated. However the molding compositions were varied as follows.

In Example 19, 28 grams of water were introduced to the muller togther with the phenolic resin and the accelerator.

In Example 20, 23 grams of water were added to the muller with the phenolic resin and accelerator, and the ratio of resin components was varied.

In Example 21, no phenolic resin was employed, and 98 grams of water were added to the muller to provide the best operating conditions for the urea resin component.

The tensile strength of the series of test samples prepared in Examples 18 through 21 are shown in Table 2 together with the results obtained in Example 11 in which no urea resin component was employed.

TABLE 2

| Example No. | 11 | 18 | 19 | 20 | 21 |
|---|---|---|---|---|---|
| Molding Composition: | | | | | |
| Phenol-Formaldehyde Resin, grams | 227 | 114 | 114 | 136 | |
| Dimethylol Urea, grams | | 113 | 113 | 91 | 227 |
| Ammonium Chloride Solution, grams | 21.2 | 27.6 | 27.6 | 27.6 | 27.6 |
| Water, grams | | | 28 | 23 | 98 |
| Sand, pounds | 25 | 25 | 25 | 25 | 25 |

Cure Time, seconds:     Tensile Strength, pounds per sq. in.

| | | | | | |
|---|---|---|---|---|---|
| 10 | | 126 | 85 | 119 | |
| 15 | | 146 | 141 | 129 | |
| 20 | | 175 | 198 | 209 | |
| 30 | 120 | 214 | 302 | 284 | 20 |
| 60 | 365 | | | | |
| 120 | 414 | | | | |

A comparison of the data in Table 2 shows that the use of dimethylol urea alone was of no avail; the use of the phenolic resin alone resulted in a slow curing molding composition. However, the use of combinations of these resin components produced fast curing molding compositions.

The following example shows the preparation of a consolidated wood composition in accordance with the invention.

*Example 22*

About 10,900 parts of wood flake were placed in a horizontal rotating drum.

An aqueous solution was prepared which contained 75 percent of a liquid one-step phenol formaldehyde resin prepared as in Example 1, 17.5 percent of the aqueous urea formaldehyde of Example 1, and 7.5 percent of solid urea. This solution (853 parts), was admixed with 171 parts of an aqueous accelerator solution comprised of 50 percent water, 38 percent urea and 12 percent ammonium chloride.

The resulting resinous solution was sprayed onto the wood flakes while the drum was rotated at a speed of about ten r.p.m. A period of about eight minutes was required to spray the resinous solution on the flakes. A wooden frame with an opening of about twenty-four inches by twenty-four inches and a height of about eight inches was placed on a steel caul and a sufficient amount of the coated wood flakes were sprinkled on the caul to substantially fill the frame. Another steel caul was placed on top of the flakes and placed in a hot press. The press was closed to stops producing a board having a density of forty pounds per cubic foot. The temperature in the press was above 325 degrees Fahrenheit, and the board was retained in the press for a period of eleven minutes. The maximum internal temperature of the board was about 230 degrees Fahrenheit. The board on removal from the press had an excellent appearance.

Various modifications can be made in the invention without departing from the spirit thereof. Therefore, we do not wish to be limited by specific details set forth in the foregoing specification.

We claim:

1. A binder composition comprising a liquid one-step phenol formaldehyde resin, a urea resin component selected from the group consisting of urea formaldehyde and thiourea formaldehyde, and an acid salt curing accelerator, wherein the molar ratio of formaldehyde to phenol in the phenol-formaldehyde resin is between about 1.5:1 and about 2.5:1, and the molar ratio of urea and/or thiourea to formaldehyde in the urea resin component is between about 1:1 and about 1:5.

2. The composition of claim 1 wherein said urea resin component is an aqueous solution of urea formaldehyde.

3. The composition of claim 1 wherein said urea resin component is an aqueous solution of thiourea formaldehyde.

4. The composition of claim 1 wherein said urea resin component is a solid dimethylol urea composition.

5. The process for bonding discrete solid particles which comprises admixing said particles with a liquid one-step phenol formaldehyde resin, a urea resin component selected from the group consisting of urea formaldehyde and thiourea formaldehyde and an accelerator selected from the group consisting of acids and acid salts to yield a wet mixture, and heating the resulting wet mixture to effect setting of the resinous components, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

6. The process of claim 5 wherein said urea resin component is an aqueous solution of a urea formaldehyde composition.

7. The process of claim 5 wherein said discrete solid particles are sand.

8. The process for preparing foundry cores which comprises admixing said with a liquid one-step phenol formaldehyde resin, a urea resin component selected from the group consisting of urea formaldehyde and thiourea formaldehyde, an accelerator selected from the group consisting of acids and salts of acids to yield a wet mixture, adding the wet mixture to a hot core box to form a core of a desired shape and heating the wet mixture to effect setting of the resinous components, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

9. The process for preparing consolidated wood compositions which comprises admixing wood particles with a liquid one-step phenol formaldehyde resin, a urea resin component selected from the group consisting of urea formaldehyde and thiourea formaldehyde, an accelerator selected from the group consisting of acids and salts of acids to yield a wet mixture, pressing the wet mixture to form a desired shape, and heating the shaped wet mixture to effect setting of the resinous components, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

10. A foundry core composition comprising sand and between about 0.2 and about five percent by weight of a resinous binder based on the weight of sand, said resinous binder being comprised of the reaction product of a liquid one-step phenol formaldehyde resin, a urea resin component selected from the group consisting of urea formaldehyde and thiourea formaldehyde, and an accelerator selected from the group consisting of acids and salts of acids, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

11. The composition of claim 10 wherein said accelerator is ammonium chloride.

12. The composition of claim 10 wherein said accelerator is phosphoric acid.

13. A consolidated wood composition comprising wood particles and between about two and about twenty percent by weight of a resinous binder based on the weight of wood particles, said resinous binder being comprised of the reaction product of a liquid one-step phenol formaldehyde resin, a urea resin component selected from the group consisting of urea formaldehyde and thiourea formaldehyde, and an accelerator selected from the group consisting of acids and salts of acids, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

14. The composition of claim 13 wherein acid accelerator is ammonium chloride.

15. A foundry core composition comprising sand, and between about 0.2 and about 5 percent by weight of a resinous binder composition based on the weight of the sand, said resinous binder composition comprising a phenol-formaldehyde resin and a urea resin component selected from the group consisting of urea formaldehyde and thiourea formaldehyde, wherein the molar ratio of formaldehyde to phenol in the phenol-formaldehyde resin is between about 1:1 and about 3:1, and the molar ratio of urea and/or thiourea to formaldehyde in the urea resin component is between about 1:1 and about 1:5.

16. A binder composition comprising a liquid one-step phenol formaldehyde resin, a urea resin component selected from the group consisting of urea formaldehyde and thiourea formaldehyde, a compound selected from the group consisting of urea and thiourea, and an acid salt curing accelerator, wherein the molar ratio of formaldehyde to phenol in the phenol-formaldehyde resin is between about 1.5:1 and about 2.5:1, and the molar ratio of urea and/or thiourea to formaldehyde in the urea resin component is between about 1:1 and about 1:5.

17. The process of claim 8 wherein a compound selected from the group consisting of urea and thiourea is incorporated in the wet mixture prior to addition of the wet mixture to the hot core box.

18. The process of claim 9 wherein a compound selected from the group consisting of urea and thiourea is incorporated in the wet mixture prior to pressing the wet mixture to form a desired shape.

19. The foundry core composition of claim 10 wherein the resinous binder is comprised of the reaction product of a liquid one-step phenol-formaldehyde resin, a urea resin component selected from the group consisting of urea formaldehyde and thiourea formaldehyde, a compound selected from the group consisting of urea and thiourea, and an accelerator selected from the group consisting of acids and salts of acids.

20. The consolidated wood composition of claim 13 wherein the resinous binder is comprised of the reaction product of the liquid one-step phenol-formaldehyde resin, a urea resin component selected from the group consisting of urea formaldehyde and thiourea formaldehyde, a compound selected from the group consisting of urea and thiourea, and an accelerator selected from the group consisting of acids and salts of acids.

References Cited by the Examiner

UNITED STATES PATENTS

| | | | |
|---|---|---|---|
| 2,186,687 | 1/1940 | Thompson et al. | 260—17.2 |
| 2,500,054 | 3/1950 | Anthony et al. | 260—840 |
| 2,631,097 | 4/1953 | Redfern | 260—17.2 |

FOREIGN PATENTS 792,574   4/1958   Great Britain.

OTHER REFERENCES

Ser. No. 237,057, Greth (A.P.C.), published 1943.

WILLIAM H. SHORT, *Primary Examiner.*

E. M. WOODBERRY, *Assistant Examiner.*

UNITED STATES PATENT OFFICE
CERTIFICATE OF CORRECTION

Patent No. 3,306,864 February 28, 1967

Edward J. Lang et al.

It is certified that error appears in the above identified patent and that said Letters Patent are hereby corrected as shown below:

Column 2, line 63, after "free" insert -- from --. Column 3, line 20, cancel "1.5:1 and" line 21, before "about 2.5:1" insert -- about 1.5:1 and --. Column 11, line 49, "said" should read -- sand --.

Signed and sealed this 20th day of January 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,306,864            February 28, 1967

Edward J. Lang et al.

It is certified that error appears in the above identified patent and that said Letters Patent are hereby corrected as shown below:

Column 2, line 63, after "free" insert -- from --. Column 3, line 20, cancel "1.5:1 and"; line 21, before "about 2.5:1" insert -- about 1.5:1 and --. Column 11, line 49, "said" should read -- sand --.

Signed and sealed this 10th day of February 1970.

(SEAL)
Attest:

Edward M. Fletcher, Jr.          WILLIAM E. SCHUYLER, JR.
Attesting Officer                   Commissioner of Patents

Disclaimer 3,306,864.—*Edward J. Lang*, Grand Island, *Frank S. Grazen*, North Tonawanda, and *Frank W. Less*, Kenmore, N.Y. PHENOL FORMALDEHYDE-UREA RESIN COMPONENT BINDER. Patent dated Feb. 28, 1967. Disclaimer filed Aug. 30, 1971, by the assignee, *Hooker Chemical Corporation*.

Hereby enters this disclaimer to claims 1 to 4, inclusive, of said patent.
[*Official Gazette November 16, 1971.*]